(12) United States Patent  
Rockenfeller

(10) Patent No.: US 7,212,403 B2
(45) Date of Patent: May 1, 2007

(54) APPARATUS AND METHOD FOR COOLING ELECTRONICS AND COMPUTER COMPONENTS WITH MANAGED AND PRIORITIZED DIRECTIONAL AIR FLOW HEAT REJECTION

(75) Inventor: Uwe Rockenfeller, Builder City, NV (US)

(73) Assignee: Rocky Research, Boulder City, NV (US)

( * ) Notice: Subject to any disclaimer, the term of this patent is extended or adjusted under 35 U.S.C. 154(b) by 268 days.

(21) Appl. No.: 10/972,879

(22) Filed: Oct. 25, 2004

(65) Prior Publication Data

US 2006/0087810 A1  Apr. 27, 2006

(51) Int. Cl.
 *G06F 1/16* (2006.01)
 *H05H 7/20* (2006.01)
(52) U.S. Cl. .................. 361/687; 361/707; 165/104.33
(58) Field of Classification Search ........ 361/679–682, 361/724–727, 697, 699; 62/259.2; 165/104.33; 210/478
See application file for complete search history.

(56) References Cited

U.S. PATENT DOCUMENTS

| | | | |
|---|---|---|---|
| 3,476,175 A | 11/1969 | Plevyak | |
| 3,609,991 A | 10/1971 | Chu et al. | |
| 4,519,013 A | 5/1985 | Breeze et al. | |
| 4,612,979 A | 9/1986 | Heitzig | |
| 4,729,060 A | 3/1988 | Yamamoto et al. | |
| 4,783,721 A | 11/1988 | Yamamoto et al. | |
| 5,168,919 A | 12/1992 | Berenholz et al. | |
| 5,216,580 A | 6/1993 | Davidson et al. | |
| 5,412,535 A | 5/1995 | Chao et al. | |
| 5,456,081 A | 10/1995 | Chrysler et al. | |
| 5,582,242 A | 12/1996 | Hamburgen et al. | |
| 5,598,320 A | 1/1997 | Toedtman et al. | |
| 5,953,930 A | 9/1999 | Chu et al. | |
| 5,986,882 A * | 11/1999 | Ekrot et al. ............. | 361/687 |
| 6,230,788 B1 | 5/2001 | Choo et al. | |
| 6,262,891 B1 | 7/2001 | Wickelmaier et al. | |
| 6,474,409 B1 | 11/2002 | Sterner | |
| 6,542,361 B2 * | 4/2003 | Paradis ................... | 361/687 |
| 6,588,498 B1 | 7/2003 | Reyzin et al. | |
| 6,657,121 B2 | 12/2003 | Garner | |
| 6,679,315 B2 | 1/2004 | Cosley et al. | |
| 6,761,212 B2 | 7/2004 | DiPaolo | |
| 6,813,149 B2 * | 11/2004 | Faneuf et al. ............. | 361/687 |
| 2004/0011511 A1 | 1/2004 | Ghosh et al. | |

* cited by examiner

*Primary Examiner*—Hung Van Duong
(74) *Attorney, Agent, or Firm*—Knobbe Martens Olson & Bear LLP

(57) ABSTRACT

An apparatus and method of cooling a plurality of electronic components in a housing using one or more fans cooperating with baffles or ducts for directing a stream of air sequentially to the components or heat exchangers for the components. Direction of the air stream to the components is based on predetermined cooling prioritization of the plurality of components.

73 Claims, 4 Drawing Sheets

APPARATUS AND METHOD FOR COOLING ELECTRONICS AND COMPUTER COMPONENTS WITH MANAGED AND PRIORITIZED DIRECTIONAL AIR FLOW HEAT REJECTION

BACKGROUND OF THE INVENTION

The housing, casing or container for a computer defines a space in which various heat-generating electronic components are secured, typically mounted on boards which themselves are secured in the housing. It is known to use heat sinks, for example conductive or phase change heat exchange components at or in thermal communication with specific components to cool the heat generating electronic components and further provide heat dispersion with one or more fans. Typically the fans move air for the purpose of heat removal from the above mentioned conductive or phase change components or in some cases directly from the electronic components. Enhanced surface designs for improved convective heat transfer are sometimes applied. Fans or blowers are also used to move or circulate air within the space of the casing to provide convection and thereby heat removal via the air without any priority regard to specific components or move air to provide airflow from and to the casing and to and from the ambient environment. In a computer system there are often a variety of different heat-generating components including high power density microprocessors some, if not many, having different cooling requirements. Cooling of the most important electronic components is not necessarily achieved by providing maximum cooling air speed over all components which can increase the air temperature unnecessarily from cooling non-critical components capable of operating reliably at elevated temperatures or operating at lower energy densities not leading to a critical operating temperature before such air actually reaches the more critical component, and whereby the now higher air temperature makes it more difficult to provide effective cooling to the critical component.

Methods and components for achieving improved cooling and thermal management of electronic components are called for as faster processing speeds require higher power levels for electronics and where higher resolutions require higher power levels for displays, both leading to higher heat loads, which need to be removed in order to maintain operating temperatures of the components below critical temperatures at which the reliability and ultimately the functionality is compromised. Moreover, computing, display, recognition, targeting and other electronics systems may need to be operated in non-air conditioned spaces, such as tents, the back of vehicles, inside non-air conditioned trucks and military fighting vehicles or outside under high ambient temperature conditions much harsher on the thermal management of the electronic components as compared to conditions encountered in air conditioned office spaces, typically maintained at or below about 75° F. Ambient temperatures in the above mentioned non-air conditioned spaces can reach temperatures well above 100° F. often even above 120° F. For such operating scenarios improved methods and apparatus for cooling electronics is required even if the electronic components are not at the high end of the heat generation spectrum. Electronic equipment designed to operate in harsh environments sometimes requires the housing or portions of the housing to be isolated from the ambient air to avoid contamination of the electronic components and boards with dust, dirt or moisture of the environment. In such cases the housing or a portion of the housing is sealed and the necessary heat transfer required to manage the temperature of the heat generating electronic components is further limited in that it must be accomplished with means providing heat transfer through the housing walls, often inadequate because the surface area and thermal conductivity of the housing wall is usually incapable of transferring a significant portion of the heat to be rejected, nor is the housing wall commonly in good thermal contact with the heat generating components.

SUMMARY OF THE INVENTION

Apparatus and method for cooling an electronics or computer system comprising a housing or casing containing a plurality of heat-generating electronic components, typically mounted on boards, including, but not limited to, microprocessors, memory chips, display and/or computer chips, and secured at different sites in the housing, and having one or more fans for directing air flow within the air space, is characterized by a plurality of baffles and/or air ducts cooperating with the one or more fans for directing the air flow in selected sequence and in heat exchange communication with the electronic components. The method for cooling the plurality of heat-generating electronic components comprises prioritizing each of the plurality of heat-generating components based on the cooling requirements and critical operating temperature limits of the respective components, positioning the baffles and/or air ducts so as to direct the air flow from the one or more fans to the different electronic components, and directing the air flow to the respective components in selected sequence based on prioritized cooling requirements. The apparatus and method may be used in combination with other passive and/or active cooling devices or heat sinks.

DESCRIPTION OF PREFERRED EMBODIMENTS

Figure 1:
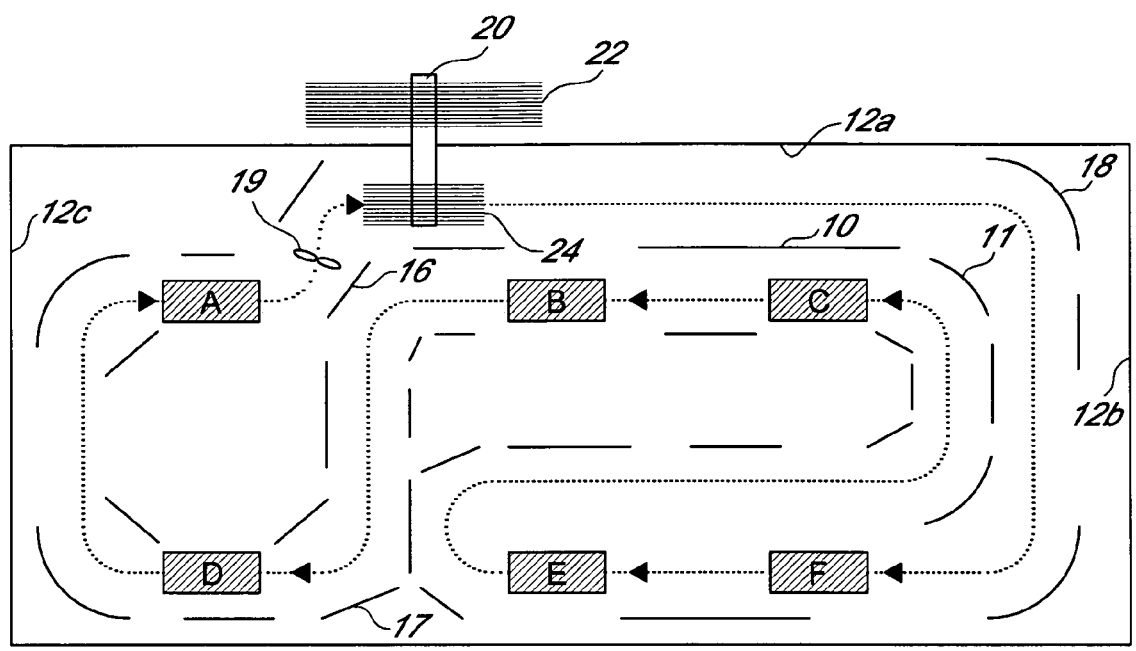
FIG. 1 schematically illustrates the interior of an electronic apparatus showing baffles for directing fan driven airflow sequentially to different electronic components within the sealed apparatus housing.

In the method and apparatus described herein and illustrated in the drawings, management of the air flow is used to direct a stream of air generated or created by the fans sequentially to the heat-generating electronic components and/or heat exchangers also referred to herein as cooling components and "heat sinks". The air flow direction is based on prioritization of the power densities and operating temperature reliability limits and corresponding cooling requirements of the different heat-generating electronic components. The stream of air is directed by using baffles and/or ducts positioned inside the housing. A plurality of baffles are positioned to cooperate with one another and/or the interior housing wall surface to form one or more passageways for directing the forced air to contact and sequentially cool the plurality of heat generating components. One or more flow splitters may also be used with or formed by the baffles to separate an air stream into a plurality of component cooling passageways which may (or may not) be rejoined. The baffles may be flat, curved or otherwise shaped to create the desired air flow stream. One or more ducts comprising conduits or panels forming a passageway or channel may be used to direct the stream of air. A duct may be an enclosed tube or conduit, or for example, may comprise a series of baffles placed end to end. Baffles or ducts may be used alone or in combination to form such passageways. In the different embodiments schematically shown in the drawings, the various baffles and/or ducts and their numbers, dimensions and locations are intended to be representative and for the purpose of illustration only, and not for precision or accuracy.

At least a portion of the heat created by the plurality of heat generating components inside the computer or electronic apparatus housing is rejected to the aforedescribed stream of air. One or more of the heat generating components may be positioned in the air stream flow whereby the heated component is directly cooled by the air flow. Alternatively, a passive or active cooling component or heat sink in thermal communication with a heat generating component and the air stream may be provided whereby the generated heat is transferred and rejected to the air stream via the heat sink. Examples of suitable passive cooling components are thermosyphon heat exchangers, heat pipes, solid thermal conductors such as metal blocks, and enhanced heat transfer surfaces, for example, finned surfaces that provide for greater heat transfer. Such passive cooling components are provided, installed or designed with a heat collecting or heat transfer member thermally communicating with the heat generating component and a heat rejecting member positioned directly or in heat exchange exposure with the air stream. One or more active heat exchangers, for example, having a refrigerant evaporator connected to a refrigeration system or a thermoelectric cooler, for rejecting heat to an air stream may also be used. Cooling of the air stream using active and/or passive cooling components will be described hereinafter.

In the apparatus schematically illustrated in FIG. 1, there are six main different heat generating electronic components in the system housing interior space. In the embodiment shown, the apparatus comprises a closed and sealed system within external housing wall 12 in which no outside air or gas enters the space. In such an apparatus, all of the heat generated within the system must be dissipated through the walls for external heat rejection. As further illustrated, a series of baffles are used to direct the flow of air from the fan 19 sequentially to the six different heat-generating electronic components. The air flow direction for sequential heat management is based on prioritization of the six electronic components. By way of example, the power density of component A is 100 Watts (e.g. a power supply), component B is 50 Watts (e.g. a graphics card), component C is 20 Watts (e.g. a PCI slot card), component D is 12 Watts (e.g. a hard disc), component E is 80 Watts (e.g. a first processor) and component F is 80 Watts (e.g. a second processor). It will be observed that the air ducts direct the gas directly onto the different components or component heat exchanger(s) or heat sink along a directed flow path based on component cooling prioritization and heat management of the gas.

In FIG. 1, a sealed or enclosed housing is shown whereby no outside air or gas enters the housing interior or is otherwise mixed with the interior gas directed to cool the heat generating components. To provide cooling for such apparatus, heat is rejected to the outside of the apparatus using cooling components installed through the housing wall for directing heat from the interior to the outside, i.e., exteriorly of the housing. One or more active and/or passive cooling devices may be used at desired and selected locations along the gas flow path for rejecting heat of the gas stream created by heat rejected to the gas stream by the heat generating components. In the embodiment of FIG. 1, a thermosyphon heat exchange device 20 is shown. The thermosyphon cooling device 20 includes an outside heat exchange component 22 exposed externally of the wall of the external housing 12 and an interior heat exchanger 24 positioned in the air flow stream. The thermosyphon device is installed in the housing wall with the thermosyphon line or lines extending through the walls sealed so that no fluids, dust, or other material may enter the housing from the outside. A typical thermosyphon device design circulates refrigerant fluid between the internal and external heat exchangers. The refrigerant is condensed in the external heat exchange component 22 and the heat of condensation rejected by the external heat exchange component surfaces. The condensed refrigerant is circulated to the evaporator heat exchanger 24 exposed within the interior of housing wall 12 whereby refrigerant is evaporated and absorbs heat from the passing air stream. Fan 19 drives the air stream between fins of the heat exchanger to cool the air stream.

A plurality of baffles direct the flow of the air stream in desired and prioritized sequence of the electronic components A–F as shown. In the embodiment illustrated in FIG. 1, downstream from fan 19 and thermosyphon heat exchanger 24, a series of baffles 10, 11, 13, 14 and 18 cooperate with interior walls 12a and 12b to direct the flow of gas serially to heat-generating electronic components F and E, sequentially cooling those components. After component E, the air stream meets angled baffle 15 and is directed toward baffle surfaces 13 and 11 and continues to sequentially cool electronic components C and B. The air stream is then diverted by baffles 16 and 17 to cool electronic component D, and diverted thereafter by baffles to pass along the interior surface of wall 12c then directed by another baffle to electronic component A. Fan 19 draws and blows the air flow stream across heat exchanger 24 re-cooling the air stream and then to repeat the sequential contact and cooling of the electronic components as described. The baffles may be situated in any desirable position, so long as the air flow is diverted for the sequential cooling as described. The edges of the baffles may extend entirely to the upper and lower interior apparatus housing surfaces or otherwise in proximity to such surfaces so that the air flow is properly diverted and directed and so that other air flows which would unduly disperse, interrupt, divert or conflict with the desired air flow are avoided. However, where such baffles are used rather than continuous air ducts or conduits, allowance for some air passage between the baffles or outside of the specific direction shown may be tolerated. Additional fans may also be used, with the fan motors positioned exteriorly of the housing or at least exterior to the directed airflow, if interior motor heat is to be avoided in the apparatus housing or directed airflow, respectively. In FIG. 1, a number of baffles shown are not specifically identified with reference numerals. Moreover, the number of baffles shown is by way of example only.

Figure 2:
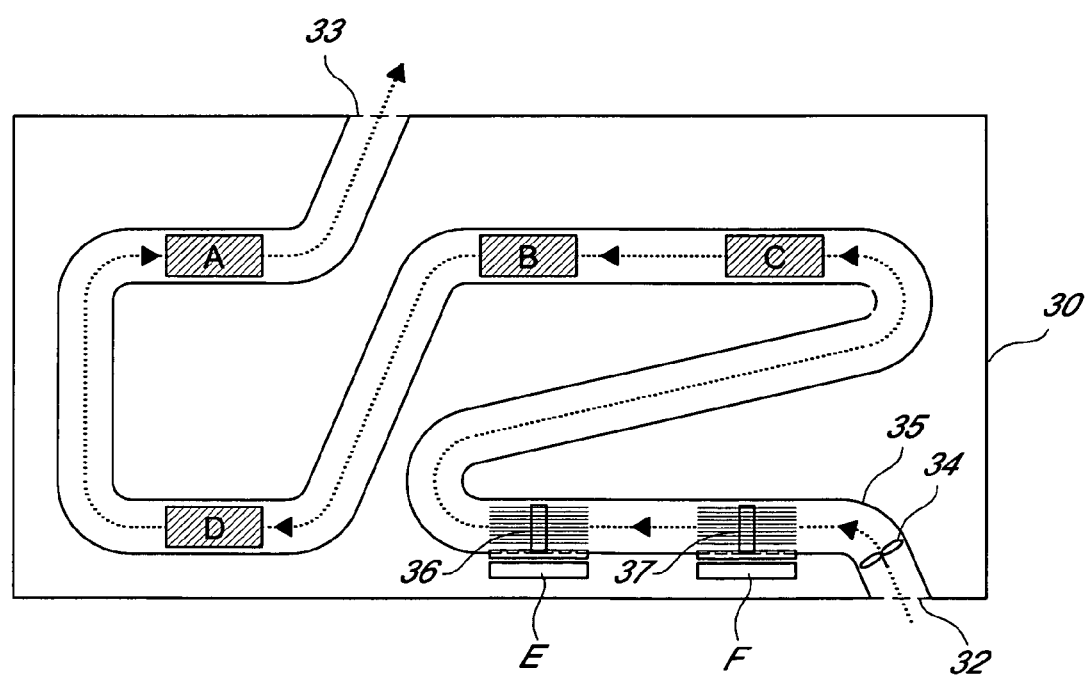
FIG. 2 is a schematic view of the interior of an electronic apparatus showing air ducts for directing fan driven outside ambient air sequentially to a plurality of different electronic components and heat exchangers for electronic components within the apparatus housing.

In the embodiment illustrated in FIG. 2, air flow management is carried out using a conduit system in the form of ducts for directing air drawn from the outside of the housing. The walls of the housing 30 include an inlet port 32 allowing outside air to be drawn into the interior space, and an exhaust port 33 for exhausting the heated gas. Air flow management is directed sequentially to the heat generating electronic components A–E based on selected prioritized cooling requirements by a conduit 35 shown. In the schematic illustration, heat exchangers 36 and 37 are exposed to the stream of cooling air flowing along the conduit for cooling electronic components E and F, respectively. At selected locations along the conduit, one or more active and/or passive heat sinks or heat exchangers may be used to reject heat from an electronic component to the air stream or from the air stream or used with other of the components for further enhancing the efficiency of the system. The heat exchangers or heat sinks illustrated comprise spot coolers having a heat transfer plate in thermal contact with the electronic component and a finned tube which extends into the air flow passageway of the interior of the air duct 35. Such spot coolers may be used for heat exchange and cooling of any of the different heat generating electronic components. The air flow created by fan 34 directs the stream of air along the interior of the conduit and through the one or more spot cooler heat exchangers or directly onto the electronic component or its heat rejection surface. Again, the air duct directs the flow of air serially to the plurality of electronic components for a prioritized sequential cooling in the manner illustrated. While FIG. 2 shows a system using air from exterior to the housing, it is by way of example only. A sealed system circulating interior air or gas only with heat exchange means to direct thermal energy to the exterior as shown in FIG. 1 may be facilitated with air ducts as well. Conversely, baffles may be used in systems using air from the exterior.

Figure 3:
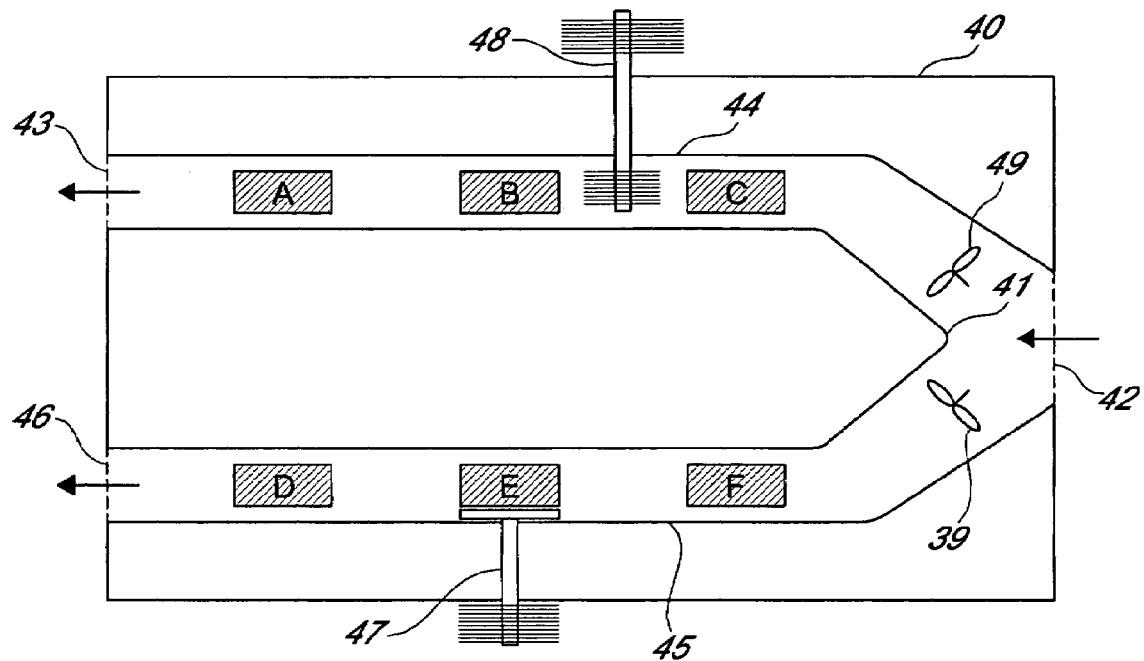
FIG. 3 is a schematic illustration of a plurality of air ducts including a stream splitter for directing multiple flows of fan driven air sequentially to electronic components within an apparatus housing.

FIG. 3 illustrates another example of an open electronic apparatus housing 40 having an inlet port 42, two outlet ports 43 and 46. Air flow from the inlet port is divided by flow splitter 41 cooperating with air ducts 44 and 45 and fans 39 and 49 to direct two parallel streams of air to sequentially and serially cool different electronic components. A solid metal thermal conductor 48 is shown installed through the wall for cooling one of the air streams. FIG. 3 also illustrates the use of a heat pipe 47 installed through the wall of the apparatus for directing heat from component E to be rejected exteriorly of the housing. A heat sink or plate may be used to direct heat from a component to the heat pipe. A heat pipe or thermal conductor shown in FIG. 2 may be used for cooling any component or for cooling a stream of air directed for cooling the electronic components. Instead of each of the streams exiting the housing at separate outlet ports as shown in FIG. 3, they may be rejoined to exit at a single port. The two passageways may rejoin and again separate before exiting the housing, or again be rejoined. Moreover, such plural passageways need not be parallel and may be configured as desired to optimize the cooling of the various electronic components.

Figure 4:
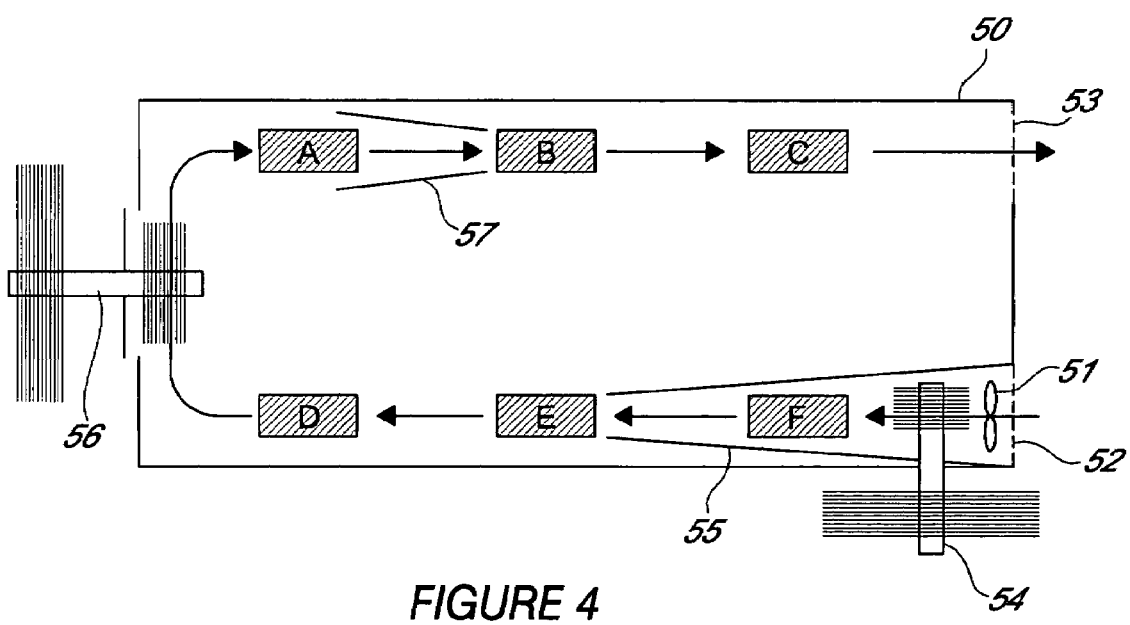
FIG. 4 illustrates the use of baffles for increasing velocity of air flow sequentially directed to a plurality of electronic components within an electronic apparatus housing.

FIG. 4 illustrates the use of baffles and air ducts for selectively changing the velocity of the air stream as it is directed sequentially to the different heat-generating components or the heat rejection surface of the component coolers for such heat generating components. As shown in this example, electronic components E and B, having the power densities described above in FIG. 1 may have more critical cooling requirements, for example, narrow efficient operating temperature ranges, as compared to the other components. By shaping the air flow path with the ducting 55 and baffling 57 as illustrated or by positioning an additional fan in the airflow path (not shown), increased air velocity is provided at components E and B, thereby increasing or concentrating air speed at those components for improving heat transfer and cooling efficiency. Typical air velocity enhancements are on the order 20% to 150% leading to heat transfer coefficient improvements of 10% to 60%. Higher air flow velocity increases heat transfer and may also change the flow from laminar flow regime to turbulent flow regime thereby further increasing heat transfer. Velocity increases above 100% are more easily attained with the addition of a fan. FIG. 4 illustrates an example of a thermal management system using a pre-cooler 54 and an in-stream re-cooler 56 positioned in the airflow across the board.

Prioritization of the cooling requirements for the different heat-generating components may be other than simply directing the cooling gas first to the higher power density or more critical operating temperature prone component and sequentially to the other components based on their decreasing power densities or operating temperature requirements. For example, it may be desirable to direct the gas sequentially to different electronic components, for example, first to component F, then to component E, to component C, etc., whereby the use of the baffles and air management also is optimized based on the space or area within the housing as well as optimizing the routing of the gas flow management and direction. The thermal management system for any electronic component cooling can be further enhanced by the use of one or more active cooling devices applied to the airflow allowing for pre-cooling and/or re-cooling of the air or gas used for heat transfer from the electronic component surface or the heat rejection surface of a component cooler. The active cooling can be provided from an external cold source, a thermoelectric cooler, a complex compound cooling system or a vapor compression system. The thermal management system can also include one or more components using dedicated through the wall cooling systems and thereby not contributing to the thermal load of the air stream.

In some cases the harsh environment requires the housing or at least portions of the housing to be isolated from the ambient air to avoid contamination of the electronic components and boards with dust, dirt or moisture of the environment. In such cases the housing needs to be sealed and the necessary heat transfer to limit the temperature of the heat generating electronic components has to be accomplished with means providing heat transfer through the housing walls. The surface area and thermal conductivity of the housing wall is usually not adequate to transfer a significant portion of the heat to be rejected nor is the housing wall in good thermal contact with the heat generating components. It is therefore necessary to include through-the-wall heat transfer devices. Such devices can be passive thermal conductors, for example, heat pipes, phase change thermosyphons, or conductive devices including solid thermal conductors comprising metals having relatively high thermal conductivity, such as aluminum or copper. The effectiveness of such devices is enhanced by providing directed air or gas flow across the heat transfer area inside the housing, such heat transfer area preferably designed with a geometry allowing for good heat transfer arising from the directed air or gas flow. The effectiveness is further enhanced by either providing also convective flow to the heat transfer area of the device positioned outside the housing or by providing a heat sink to such outside surface area or system portion, e.g. a refrigerated or cooled liquid or gas stream, an evaporation of refrigerant, or the cold side of a thermoelectric device.

Figure 5:
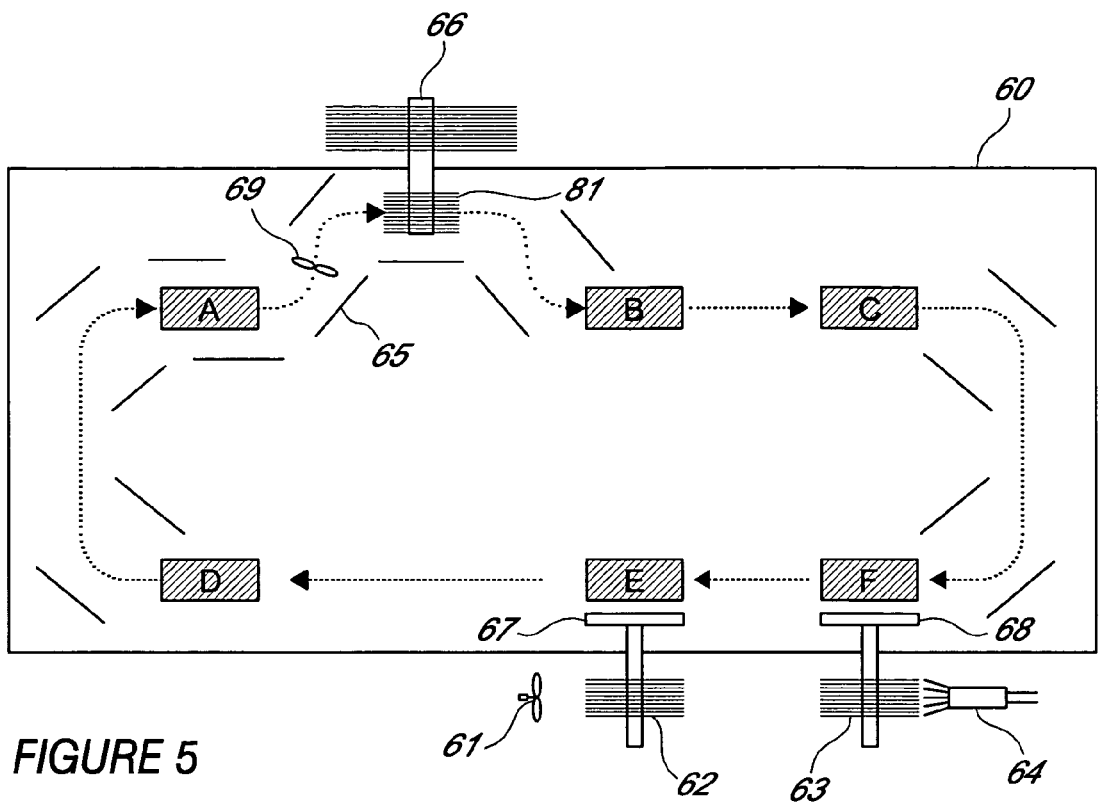
FIGS. 5 and 6 schematically illustrate various through-the-wall cooling devices for cooling components and air streams directed sequentially to a plurality of heat-generating computer components.
Figure 6:
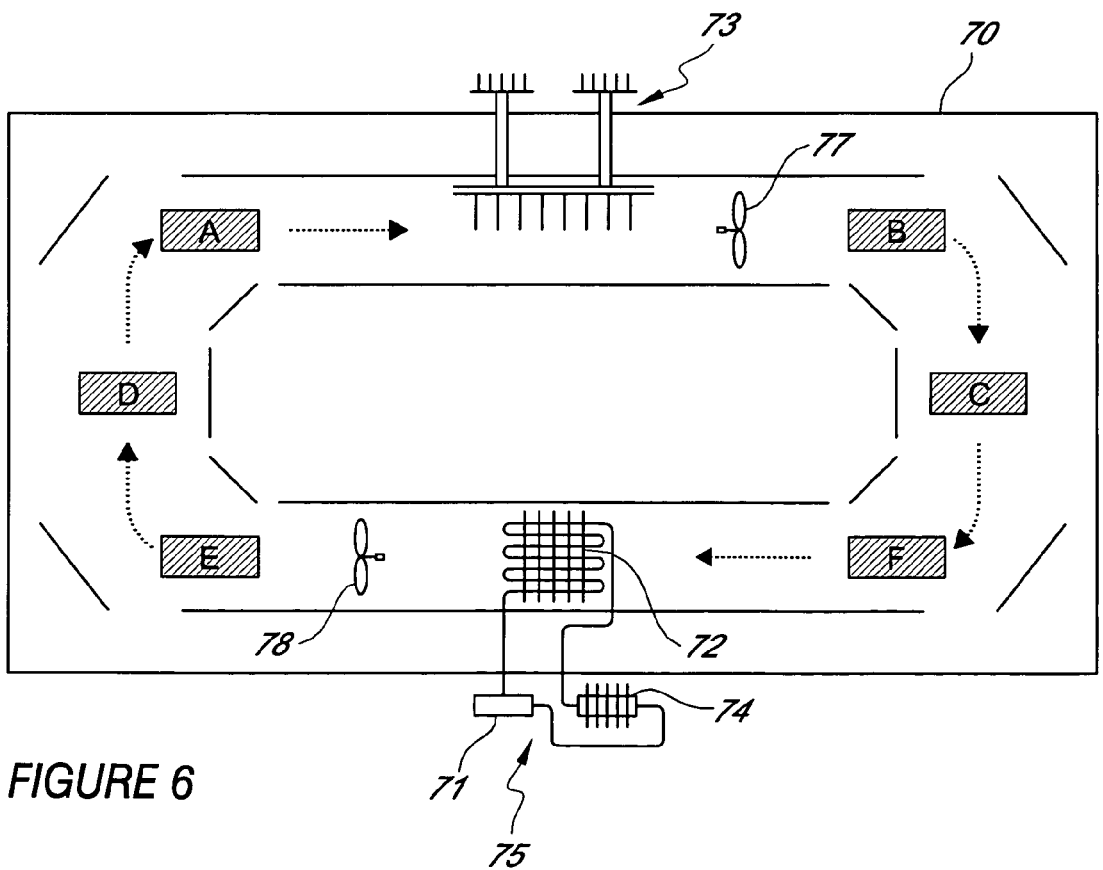

FIGS. 5 and 6 illustrate examples of through-the-wall heat exchangers for cooling an air stream and for cooling individual components inside of the housing. In FIG. 5, thermosyphon case cooler 66 is used to cool the air directed by fan 69 and cooperating baffles or ducts 65 through heat exchange fins of evaporator 81. Additional through-the-wall coolers 62 and 63 cooperating with heat sinks 67 and 68, respectively, are provided to reject heat from components E and F, respectively. External heat rejection of heat exchanger 62 is provided by fan 61. For heat exchanger 63, a water nozzle 64 is used to cool the external heat exchange fins. However, other heat rejection components or methods may be used on the housing exterior for dissipating heat from the internal heat exchangers. Again, the air stream is directed for prioritized cooling of the electronic components. Heat sinks may also be used for cooling any of the electronic components and additional heat exchangers providing more air stream cooling may be used if needed or desired.

The enclosed case 70 illustrated in FIG. 6 shows other examples of through-the-wall heat exchangers 73 and 75 for cooling a stream of air in an electronic apparatus. A thermoelectric cooling unit 73 cools the air directed between components A and B within the housing 70. Heat exchanger 75 is a complex compound cooler incorporating a reactor, 71, an evaporator 72 and condenser 74. Such a heat exchanger, well known in the art, is disclosed, for example, in U.S. Pat. Nos. 5,477,706 and 5,271,239, the entire descriptions of which are incorporated herein by reference. Ammonia or other polar refrigerant is evaporated in evaporator section 72 and the vaporized refrigerant is directed to reactor 71 containing a metal salt on which the gaseous polar refrigerant is absorbed. The apparatus may use one reactor, or pairs of reactors where continuous cooling is desired. A vapor compression heat exchange apparatus, not shown, well known in the art, may also be used, alone or in combination with any one or more of the aforesaid cooling devices. Fans 77 and 78 provide for air flow for prioritized component cooling within the apparatus.

Figure 7:
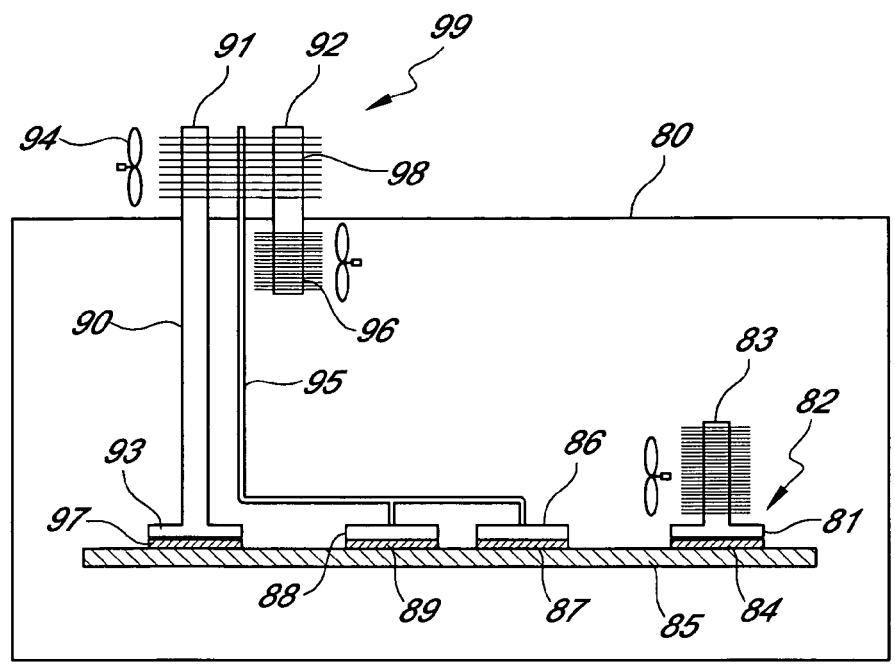
FIG. 7 is a schematic illustration of different types of heat exchangers which may be used in combination with a directed air stream for sequentially cooling a plurality of different electronic components.

FIG. 7 schematically illustrates examples of different types of heat exchange components that may be used with the prioritized directional air flow heat rejection described above and illustrated in FIGS. 1–6. In FIG. 7, an exterior wall 80 of a housing, casing or container for computer components is illustrated with heat generating electronic components 84, 87, 89 and 97 mounted on board 85. Heat generated by electronic component 84 is rejected by a spot cooler 82 having a heat transfer element 81 in heat exchange communication with a finned tube 83. The finned tube is positioned to extend into a space to be cooled by air flow as previously described. Cooling of electronic component 84 using the spot cooler is illustrative of spot coolers 36 and 37 illustrated in FIG. 2. External heat rejection may be carried out by a finned heat exchanger 92 in heat exchange communication with thermosyphon heat exchangers 91 and 98. As illustrated, electronic component 97 is in heat exchange communication with heat transfer component 93, for example, an evaporator portion of a thermosyphon cooler 90 having internal vapor and condensate lines communicating the evaporator with condenser portion 91 of the heat exchanger. Air within the housing 80 may be further cooled using a thermosyphon case cooler 99 with the evaporator portion 96 exposed in the interior space of the housing and through the house or wall and with the condenser portion 98 communicating with the finned heat exchange component 92. A fan 94 or other means including heat transfer fluid, water spray, or the like may be used to externally reject the heat and which cooperates with finned heat exchanger 92. Also illustrated is a single tube thermosyphon cooler 95 in heat exchange communication with heat exchangers 86 and 88, for cooling components 87 and 89 respectively. Such a cooling device may also be in the form of a heat pipe or similar single tube thermosyphon device. Thermosyphon case cooler 99 is representative of through-the-wall coolers illustrated in FIGS. 1, 4, and 5.

In the various apparatus embodiments illustrated herein, a heat exchanger positioned along the path of the stream of air may function as a pre-cooler for cooling the air directed to a heat generating component positioned downstream from the heat exchanger and/or as an after-cooler for cooling air downstream from a component. Of course, where the heat exchanger is between components it functions as a pre-cooler and an after-cooler, whether used in an open or closed (sealed) housing apparatus.

In some applications the housing is to be completely sealed from the environment. If such isolation includes the keyboard, the display and all connectors to and from the electronic device or computer, the complete isolation makes the entire system water-proof and airtight. The interfaces, such as the keyboard and the display can also be separate devices connected wirelessly to the computer. One extreme example application is a water-proof laptop computer that could withstand being in water, mud, dust or other harsh environment and still function as all components, interfaces, displays, etc. are protected from the environment. Such complete isolation maximizes the need for thermal heat dissipation efficiency. While directional air or gas flow inside the housing, possible air or gas speed enhancements, active air or gas cooling and individual component cooling directly through the wall of the housing are all of value in such applications, the required compactness and weight constraints of laptops require further that the housing walls themselves be used as heat transfer devices. This requires the housing to be designed for maximum natural convection heat transfer on the outside or to have fan assisted heat transfer not only on the inside wall, but also on the outside. The wall may be designed with a phase change heat transfer system either as an embedded cavity system or with small tubing for heat transfer embedded or affixed to one or more of the walls.

Figure 8:
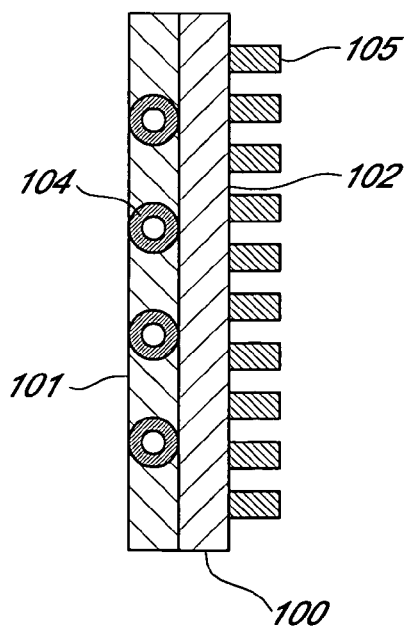
FIGS. 8 and 9 illustrate examples of components for enhancing heat transfer through a housing wall of an electronic apparatus.

FIG. 8 shows an example design of an electronic component housing wall with embedded tubing and heat transfer components for enhancing natural convection on the outside of the wall. In FIG. 8, a cross section of housing wall 100 illustrates the use of tubing 104 embedded adjacent to the interior wall surface 101 and a plurality of heat transfer fins 105 secured on the exterior wall surface 102. A heat transfer fluid, e.g., water, glycol or refrigerant, is directed through the tubing 104. Enhanced cooling is also provided with the fins 105 for heat rejection at the exterior wall surface.

Figure 9:
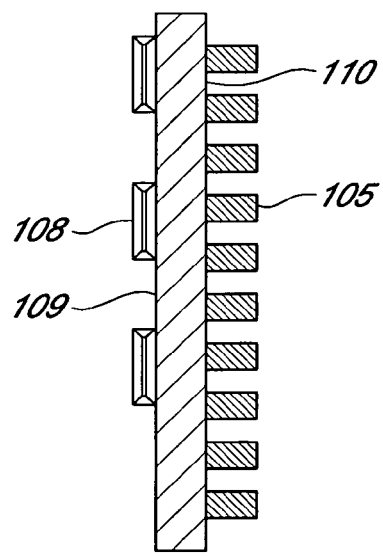

FIG. 9 shows a heat transfer enhanced housing wall capable of directly communicating with one or more chip coolers. The display may be cooled by using the backside as a heat transfer surface with enhanced geometry for convective heat transfer and/or the use of phase change thermosyphon or pumped liquid or refrigerant to transfer heat from the heat generating source to the backside of the panel. As illustrated, one or more chip coolers 108 are secured on inside wall surface 109. Again, a plurality of heat transfer fins 105 are present on the exterior wall surface 110. Waterproof fans or other airflow enhancing devices may be used to increase heat transfer on the outside heat exchange surface area.

A method for cooling an electronic apparatus comprising heat-generating electronic components having a plurality of different cooling demands in a defined air space within the apparatus housing and using one or more fans for directing air flow within the air space is characterized by prioritizing with the plurality of heat-generating components based on the cooling requirements and operating temperature constraints of the component, providing a plurality of baffles and/or air ducts for cooperating with the one or more fans for directing the fan-driven air flow stream to the different electronic components, and directing the air flow to the components in selective sequence in response to the prioritization design. One or more heat exchangers may be used for cooling the air stream and/or rejecting heat created by one or more of the individual heat generating electronic components.

What is claimed is:

1. In a computer or electronic apparatus comprising a plurality of heat generating electronic components in a housing therefore, and one or more fans cooperating therewith for providing connective air flow therein, the improvement comprising air flow directing means comprising one or more baffles and/or one or more air ducts cooperating with said one or more fans for directing a stream of air sequentially to two or more of said heat generating electronic components for cooling thereof and wherein at least one of said heat generating electronic components includes or cooperates with an active or passive cooling component in thermal communication with said stream of air for rejecting heat thereto from said electronic component.

2. An apparatus of claim 1 including one or more active or passive cooling components cooperating with said air flow direction means in cooling said stream of air.

3. An apparatus of claim 2 wherein one or more of said cooling components reject heat directly to the outside of the housing.

4. An apparatus of claim 3 wherein heat rejection outside the housing comprises convective cooling within an air fan or air blower.

5. An apparatus of claim 3 wherein heat rejection outside the housing comprises active cooling with a heat transfer fluid or evaporating fluid.

6. An apparatus of claim 1 including one or more active cooling components cooperating with said air flow direction means for cooling said stream of air.

7. An apparatus of claim 6 wherein at least one of said active cooling components comprises a heat exchanger positioned along the path of said stream of air and having means for rejecting heat externally of said apparatus housing.

8. An apparatus of claim 6 wherein at least one of said active cooling components comprises a thermoelectric cooler or a refrigerant containing heat exchanger.

9. An apparatus of claim 6 wherein at least one said active cooling components comprises a thermoelectric cooling element.

10. An apparatus of claim 7 wherein said heat exchanger comprises an evaporator of a complex compound cooling system.

11. An apparatus of claim 7 wherein said heat exchanger comprises an evaporator of a vapor compression cooling system.

12. An apparatus of claim 1 including one or more passive cooling components cooperating with said air flow direction means for cooling said stream of air.

13. An apparatus of claim 12 wherein said one or more passive cooling components comprises a thermosyphon heat exchanger, a heat pipe, a solid thermal conductor or combination of two or more thereof.

14. An apparatus of claim 13 wherein said solid thermal conductor comprises a metal thermal conductor.

15. An apparatus of claim 1 wherein one or more of said active or passive cooling components thermally communicating with one or more of said heat generating electronic components comprises means for rejecting heat thereof externally of said housing.

16. An apparatus of claim 15 including one or more passive thermal components in thermal contact with one or more of said heat generating electronic components for rejecting heat thereof to said stream of air.

17. An apparatus of claim 16 wherein one or more of said passive cooling components comprises a thermosyphon heat exchanger, a heat pipe, a solid thermal conductor or combination of two or more thereof.

18. An apparatus of claim 16 wherein one or more of said passive thermal components comprises a heat exchanger exposed to said stream of air.

19. An apparatus of claim 1 or 18 wherein said air flow directing means includes baffles and/or ducts for increasing the velocity of gas directed therethrough by at least 20% and wherein said baffles and/or ducts for raising velocity of gas are positioned for directing said increased velocity of gas at said electronic component or heat exchanger of an electronic component.

20. An apparatus of claim 1 or 15 including air flow splitting means for creating two or more separate streams of air.

21. An Apparatus of claim 1 wherein at least one of said heat generating electronic components includes a cooling component comprising a thermosyphon heat exchanger, heat pipe, solid thermal conductor or enhanced heat transfer surface exposed to said stream of air.

22. An apparatus of claim 21 including one or more active or passive cooling components communicating with said stream of air comprising one or more heat exchangers for rejecting heat eternally of said housing.

23. An apparatus of claim 1 including one or more active or passive cooling components communicating with said stream of air comprising one or more heat exchangers for rejecting heat externally of said housing.

24. An apparatus of claim 1 wherein said air flow directing means includes baffles and/or ducts for increasing the velocity of gas directed therethrough by at least 20%.

25. An apparatus of claim 24 including a booster fan cooperating with said baffles and/or ducts.

26. An apparatus of claim 24 or 25 wherein said baffles and/or ducts change the air flow from laminar flow regime to turbulent flow regime.

27. An apparatus of claim 1 including an active refrigeration cooling component in said stream of air.

28. An apparatus of claim 27 wherein said active refrigeration cooling component is positioned upstream from any heat generating electronic component.

29. An apparatus of claim 27 wherein said active refrigeration cooling component is positioned between two heat generating electronic components.

30. An apparatus of claim 27 wherein said active refrigeration cooling component is the cold side of a thermoelectric device.

31. An apparatus of claim 27 wherein said active refrigeration cooling component is a refrigerated liquid cooled heat exchanger.

32. An apparatus of claim 27 wherein said active refrigeration cooling component is a refrigerant evaporator.

33. An apparatus of claim 1 wherein said housing is sealed from the environment.

34. An apparatus of claim 33 wherein no outside air is directed into the housing and wherein said stream of air is not directed outside of the housing.

35. An apparatus of claim 34 including one or more active or passive through-the-wall heat exchangers comprising a cooling component positioned in said stream of air and a heat rejection component exterior of said housing.

36. An apparatus of claim 35 wherein said one or more through-the-wall heat exchangers includes one or more conductive heat transfer systems.

37. An apparatus of claim 35 wherein said one or more through-the-wall heat exchangers comprises phase change heat transfer.

38. An apparatus of claim 35 comprising a fan or blower for convectively cooling said one or more through-the-wall heat exchangers.

39. An apparatus of claim 35 wherein said one or more through-the-wall heat exchangers are actively cooled by a refrigerated liquid or air flow.

40. An apparatus of claim 35 wherein said one or more through-the-wall beat exchangers are actively cooled by a refrigeration.

41. An apparatus of claim 40 wherein said refrigeration comprises phase change refrigerant evaporation.

42. An apparatus of claim 40 wherein said refrigeration comprises thermoelectric cooling means.

43. An apparatus of claim 34 including a refrigeration component positioned in said stream of air.

44. An apparatus of claim 43 wherein said refrigeration cooling component is positioned to precool air directed to a heat generating component.

45. An apparatus of claim 43 wherein said refrigeration cooling component is positioned between two heat generating electronic components.

46. An apparatus of claim 43 wherein said refrigeration cooling component is the cold side of a thermoelectric device.

47. An apparatus of claim 43 wherein said refrigeration cooling component is a liquid cooled heat exchanger.

48. An apparatus of claim 43 wherein said refrigeration cooling component is a refrigerant evaporator.

49. An apparatus of claim 34 including heat sinks for directing rejected heat to the exterior of the housing.

50. An apparatus of claim 49 including means for increasing the directional air or gas velocity by at least 20% for the convective cooling of at least one of the components or component heat sinks.

51. An apparatus of claim 50 wherein said increase in directional velocity is at least partially achieved by passive means of baffles or duct cross section reduction.

52. An apparatus of claim 50 including a booster fan for at least partially increasing said directional velocity.

53. An apparatus of claim 51 or 52 wherein said increase in directional velocity changes air flow from laminar flow regime to turbulent flow regime.

54. An apparatus of claim 49 including a heat transfer fluid cooler or evaporating fluid cooler exterior to the housing for actively cooling said heat sinks.

55. An apparatus of claim 49 including one or more fans or air blowers cooperating with the heat rejecting portion of the heat sinks or chip coolers exterior to the housing.

56. An apparatus of claim 33 wherein at least a portion of an exterior wall of said housing comprises a heat transfer enhancing component on the exterior surface of said portion of said exterior wall for convective heat rejection thereof.

57. An apparatus of claim 56 wherein said air flow directing means directs said stream of air in heat exchange contact with the interior surface of said portion of said exterior wall.

58. An apparatus of claim 56 wherein said heat transfer component comprises heat exchange fins.

59. An apparatus of claim 56 wherein said portion of said exterior wall comprises heat exchangers embedded along said wall portion.

60. An apparatus of claim 59 wherein said air flow directing means directs said stream of air in heat exchange contact with the interior surface of said portion of said exterior wall.

61. An apparatus of claim 56 including tubing or channels embedded along said wall for directing heat transfer fluid or refrigerant therethrough.

62. An apparatus of claim 56 including one or more heat sinks in heat exchange communication with one or more of said heat generating electronic components in heat exchange contact with the interior surface of said portion of said exterior wall.

63. An apparatus of claim 34 wherein said flow directing means includes one or more flow splits for directing two or more of said streams of air sequentially to a plurality of different heat generating electronic components.

64. An apparatus of claim 1 comprising a plurality of air streams.

65. An apparatus of claim 1 wherein said housing comprises one or more inlet ports and/or one or more outlet ports for air flow into and out of the housing.

66. An apparatus of claim 1, 6 or 12 wherein said air flow directing means comprises one or more air flow splitters for splitting said stream of air into two or more separate air streams.

67. A method of cooling a computer or electronic apparatus comprising a housing sealed to the environment from air, gas, water or other liquids and without air exchange with the ambient, having one or more boards encased in said housing containing a plurality of heat generating electronic components rejecting heat either directly or with heat sinks attached to said components, and whereby the cooling of said heat generating electronic components or heat sinks is achieved by one or more convective streams of air or a gas inside the housing, said method comprising directing at least one of the one or more streams of air to sequentially contact two or more heat generating electronic components and/or heat sinks whereby said at least one air stream sequentially contacts each said two or more electronic components and/or heat sinks without being mixed or dispersed with another stream of air.

68. A method of claim 67 comprising providing one or more fans and one or more baffles or ducts in said housing to divert said one or more air streams to sequentially contact said two or more electronic components and/or heat sinks.

69. A method of claim 68 including prioritizing the cooling requirements of each of said two or more electronic components and arranging said one or more fans and said one or more baffles or ducts to direct said one or more streams of air sequentially to said two or more electronic components according to the order of said prioritization.

70. A method of claim 69 including providing one or more heat exchangers along each of said one or more air streams for rejecting heat thereof externally of said sealed housing.

71. A method of cooling a plurality of heat generating electronic components having two or more different cooling requirements in a computer or electronic apparatus comprising a housing having said plurality of heat generating electronic components therein comprising prioritizing the cooling requirements of the plurality of heat generating electronic components and directing a stream of air sequentially to said plurality of heat generating electronic components based on said cooling requirement prioritization.

72. A method of claim 71 comprising providing one or more fans and one or more baffles and/or ducts in said housing to divert said one or more air streams to sequentially contact said two or more electronic components and/or heat exchange components and/or heat sinks therefor.

73. A method of claim 72 including providing one or more active and/or passive heat exchangers along each of said one or more air streams for rejecting heat thereof externally of said housing.

* * * * *